Patented Feb. 5, 1924.

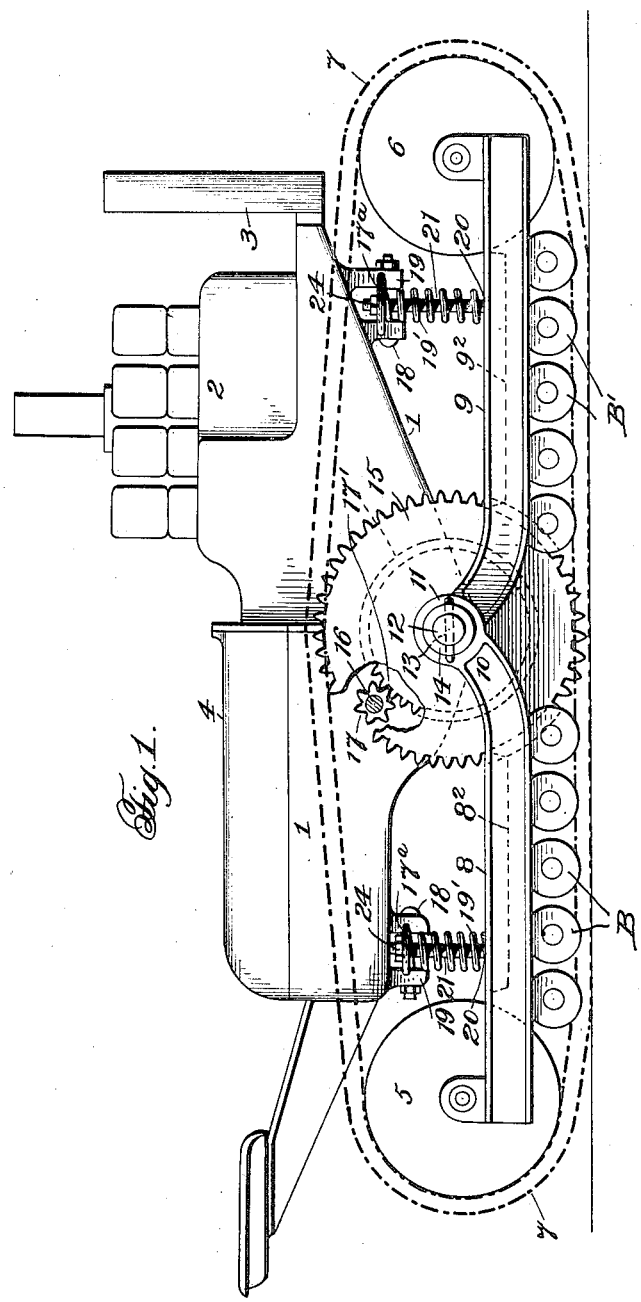

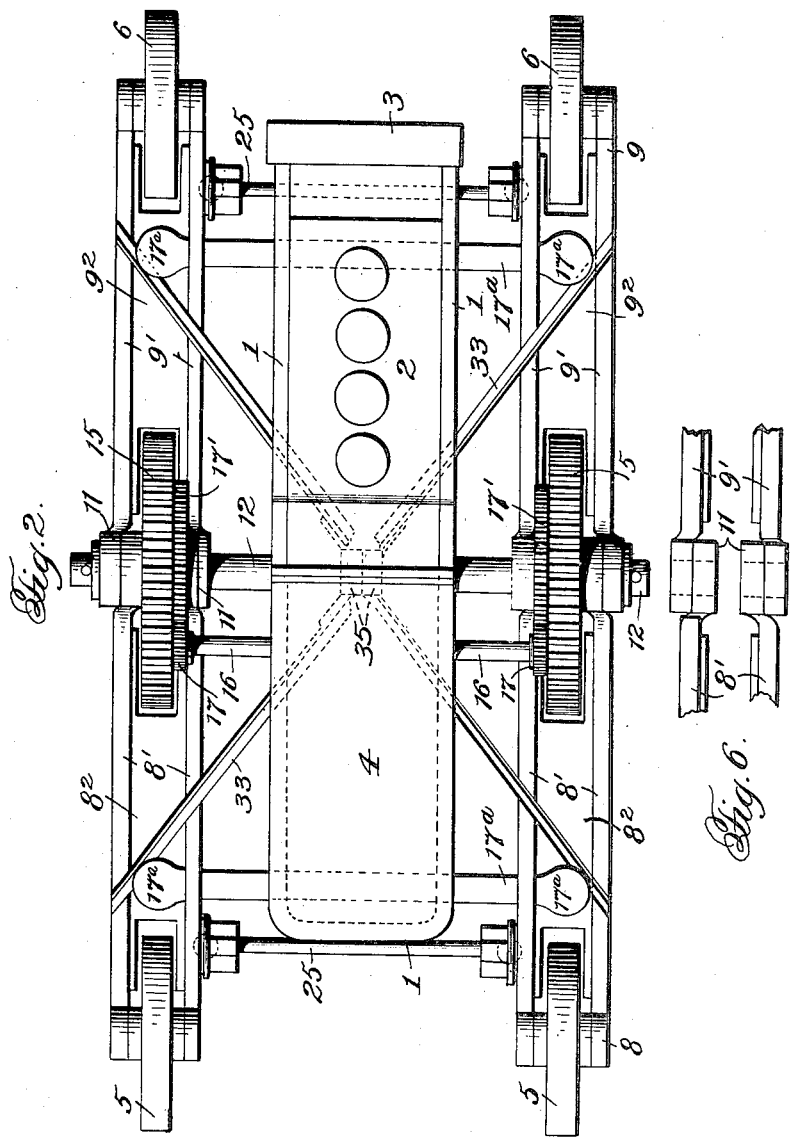

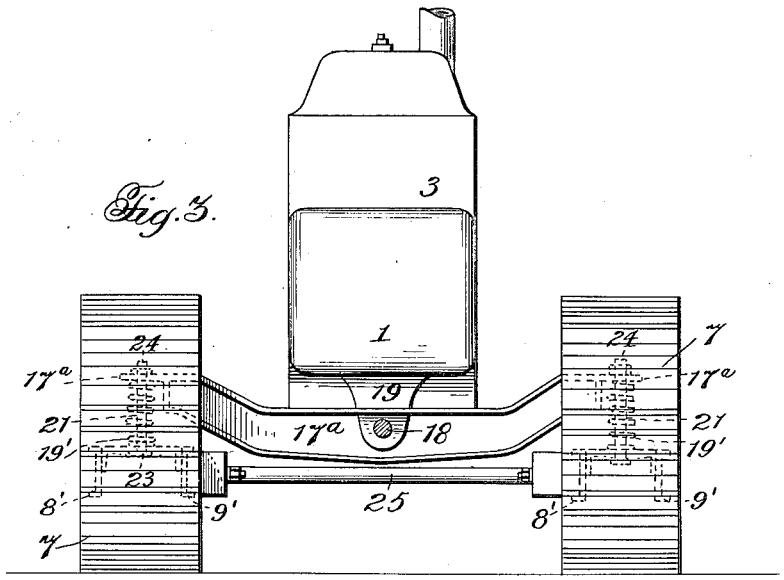
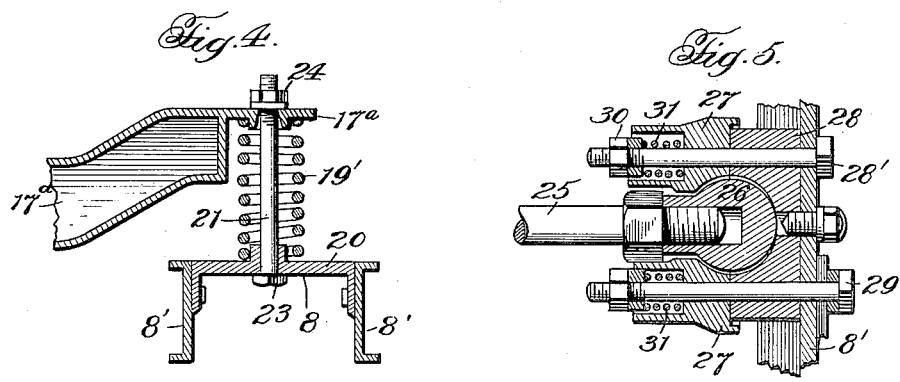

1,482,726

UNITED STATES PATENT OFFICE.

CLARENCE LEO BEST, OF SAN LEANDRO, CALIFORNIA, ASSIGNOR TO C. L. BEST GAS TRACTION COMPANY, OF SAN LEANDRO, CALIFORNIA, A CORPORATION OF CALIFORNIA.

TRACTION ENGINE.

Application filed November 5, 1920. Serial No. 422,109.

*To all whom it may concern:*

Be it known that I, CLARENCE LEO BEST, a citizen of the United States, residing at San Leandro, in the county of Alameda and State of California, have invented certain new and useful Improvements in Traction Engines, of which the following is a specification, reference being had therein to the accompanying drawing.

This invention relates to improvements in traction engines of the type in which endless tracks are employed.

The object of the invention is to provide an improved form of tractor truck, to provide increased flexibility as regards the support afforded the main frame, and the capability of the trucks to accommodate themselves to varying ground contours, to provide a more efficient drive connection for the endless tracks, and to obtain greater efficiency in the operation of the traction treads.

An important novel characteristic of the invention resides in the special form of truck provided in combination with the location of the driving sprocket intermediate the ends of the truck at the adjoining pivoted end portions of the swinging truck frame sections, whereby the endless tread is maintained to its fullest extent in effective operation under variations in the contour of the ground, and the power is applied to better advantage, resulting in a material increase in efficiency.

Another important novel feature of the invention instrumental in providing for greater flexibility and durability lies in the particular connection of the tractor truck with the main frame intermediate the ends thereof in combination with equalizer and yielding load-supporting connections between the swinging truck frame sections and the main frame at each side of the pivotal connection of the swinging truck frame sections with the main frame.

The invention, with other objects and advantages thereof, and the particular construction, combinations and arrangements of parts comprising the same will be fully understood from the hereinafter contained detailed description when considered in connection with the accompanying drawings forming part hereof and illustrating one embodiment of the invention.

In the drawings:—

Figure 1 is a side elevation of a tractor constructed in accordance with the present invention.

Figure 2 is a top plan view.

Figure 3 is an end elevation.

Figure 4 is a detail view on an enlarged scale of one end portion of one of the equalizer bars and its connection with the truck frame.

Figure 5 is a detail view of one end portion of one of the struts and its connection with the truck frame.

Figure 6 is a detail view of the journal portions at the inner adjoining ends of the hinged truck frame sections.

While a specific embodiment of the invention is illustrated by way of example in the drawings, it will of course be understood that the particular construction shown may be changed or modified and the invention embodied in other forms, as will appeal to those skilled in the art and falling within the scope of the appended claims without departing from the spirit of the invention.

In the drawings, 1 designates the main frame of the machine, shown, in this special instance, in the form of a single casting or unitary structure including the motor 2, radiator 3 and transmission 4. The main frame is supported upon a pair of tractor trucks oppositely disposed along the sides thereof. The tractor truck structure comprises a frame, idler elements 5 and 6 on the outer end portions of the frame and an endless tractor chain or tread 7. The truck frames are composed of sections 8—9 pivotally mounted at their adjoining end portions to the main frame intermediate the ends thereof for independent up and down movement at their outer portions. The truck frame sections 8—9, which are shown made up of spaced longitudinal bars $8'$—$9'$, and cross tie members $8^2$—$9^2$, are preferably, as shown, hinged to the main frame centrally of its ends, the bars $8'$—$9'$ at the inner ends of the sections having upwardly curved extensions 10 carrying suitable journals 11 which are engaged with an axle 12 suitably secured to the main frame 1. Any suitable means may be employed to retain the journals 11 in place on the axle 12, keys and washer plates 13—14 being shown in the drawings for this purpose. B—B' designate roller bearings on the frame sections 8—9 for the endless treads 7. Located centrally of the ends of the endless tread 7 at the adjoining pivotally mounted end portions of the truck frame sections 8—9 are driving sprockets 15, said sprockets 15 being journaled on the axle 12, the axis of rotation of the driving sprockets being concentric with the pivotal axis of the truck frame sections 8—9. Power is transmitted to the driving sprockets 15 by a transverse shaft 16 having pinions 17 on its outer ends meshing with pinions 17′ on the driving sprockets, the shaft 16 being connected with the motor 2 through transmission gearing 4 of any approved type, the latter being only indicated in a general way.

Equalizer mechanism and yieldable load-supporting connections are provided between each pair of oppositely disposed swinging truck frame sections 8—8, 9—9, and the end portions of the main frame at each side of its central pivotal connection with the trucks. This equalizer mechanism and the yieldable load-supporting connections comprise an equalizer bar or member 17ᵃ pivotally connected centrally of its ends to one end portion of the main frame by a pin 18 engaging bearings 19 on the main frame and equalizer member. The end portions of the equalizer bar or member 17ᵃ extend over the truck frame sections 8—9, and flexible connections are provided between these parts to allow for sufficient vertical play therebetween. In this particular instance, each of said connections comprises a coiled spring 19′ interposed between one end portion of the equalizer member 17ᵃ and the top part 20 of one of the tractor truck sections, and a vertical rod or stem 21 extending centrally of the coiled spring 19′ and through openings in the end portions of the equalizer bar and the top part 20 of the truck sections to the upper and under sides thereof, respectively, and having abutments or stops 23—24 at its ends, a resilient universal joint connection being thus provided, the rod or stem 21 slidably engaging the parts and serving to maintain them in operative relation.

Struts 25 are provided to prevent the pairs of oppositely disposed swinging truck frame sections 8—8 and 9—9 from towing together at their outer end portions. One of said struts 25 is interposed between the outer end portions of each pair of oppositely disposed swinging truck frame sections, suitable flexible connections being provided between the ends of the strut and truck frames to compensate for the vertical oscillation of the truck frames, the flexible connections between the ends of the struts 25 and the swinging truck frame sections each comprising a ball 26 on one end of the strut rod and a socket for the bolt on the truck frame. The socket is composed of separate parts 27—28 secured to the truck frame by bolts 28′—29, the bolts engaging suitable openings in the socket parts and the inner side bars 8′—9′ of the truck frame sections. The bolts 28′—29 extend a substantial distance beyond the outer face of the socket part 27, and interposed between the socket part 27 and the nuts 30 on the outer ends of the bolts 28′ are coiled springs 31. The springs 31 act to yieldably maintain the socket part 28 in close relationship with its companion socket member 27, the tension of the coiled springs 31 being such as to permit the socket part 27 to be pulled inwardly away from the socket part 28, and the strut connection to lengthen out sufficiently to compensate for the vertical play of the oppositely disposed truck frame sections relatively to each other.

33 designates brace members to prevent the opposite truck frame sections from spreading apart out of proper alignment. A pair of said braces 33 are provided for each pair of oppositely disposed swinging truck frame sections, said braces at their rear ends being provided with collars 35 which loosely engage the axle 12 near the central part thereof, the other end portions of the braces being rigidly secured by suitable means to the side bars 8′—9′ of the truck frame sections.

It will be noted that the positioning of the driving sprocket centrally of the ends of the truck provides for the application of the power to the endless tread at the most advantageous point, while at the same time owing to the special construction of truck and the location of the driving sprocket at the pivotal mounting of the swinging truck frame sections, the contact of the active portion of the endless tread at the driving sprocket with the ground under variations of the contour of the ground, is assured. The driving sprockets which, as shown in the drawings (see Fig. 1), are preferably slightly larger in diameter than the idler elements 5—6, not only serve as driving means but also as means for supporting and maintaining the active run of the endless tread in contact with the ground.

It will also be observed that by the central location of the hinged connections of the trucks with the main frame in combination with the equalizer mechanism and yieldable load-supporting connections between opposite end portions of the main frame and the opposite pairs of swinging truck frame sections, a flexible balanced structure is provided that will be largely free from strain, and will be strong and durable in use.

What I claim is:—

1. In a tracklaying tractor, the combination of a main frame, and tractor truck mechanism including a truck frame having adjoining sections pivotally connected at their adjacent end portions with the main frame for independent swinging movement, yieldable load-supporting connections between the main frame and the swinging truck frame sections, idler elements on the outer end portions of the truck frame, an endless tread engaging the idler elements and a driving sprocket located intermediate the ends of the truck at the adjacent pivotally connected end portions of the truck frame sections and operatively engaging the lower active run of the chain.

2. In a tracklaying tractor, the combination of a main frame, and tractor truck mechanism including a truck frame having adjoining sections pivotally connected at their adjacent end portions with the main frame for independent swinging movement, yieldable load-supporting connections between the main frame and the swinging truck frame sections, idler elements on the outer end portions of the truck frame, an endless tread engaging the idler elements and a driving sprocket positioned intermediate the ends of the truck frame with its axis of rotation concentric with the pivotal axis of the truck sections and operatively engaging the lower active run of the chain.

3. In a tracklaying tractor, the combination of a main frame, and tractor truck mechanism including a truck frame having adjoining sections pivotally connected at their adjacent end portions with the main frame for independent swinging movement, yieldable load-supporting connections between the main frame and the swinging truck frame sections, idler elements on the outer end portions of the truck frame, an endless tread engaging the idler elements, roller bearings on the truck frame sections for the endless chain, and a driving sprocket positioned intermediate the ends of the truck frame with its axis of rotation concentric with the pivotal axis of the truck sections and operatively engaging the lower active run of the chain.

4. In a tracklaying tractor, the combination of a main frame, and tractor truck mechanism including a truck frame comprising two sections having pivotal connection at their adjacent end portions with the main frame for independent swinging movement, idler elements on the outer end portions of the truck frame, an endless tread engaging the idler elements, a driving sprocket operatively engaging the endless tread and located intermediate the ends of the truck at the adjacent pivotally connected end portions of the truck frame sections, and yieldable load-supporting connections between the main frame and the swinging truck frame sections.

5. In a tracklaying tractor, the combination of a main frame, and tractor truck mechanism including a truck frame comprising two sections having a fixed pivotal connection at their adjoining end portions with the main frame intermediate the ends thereof for independent up and down movement at their outer end portions, idler elements on the outer end portions of the truck frame, an endless traction chain engaging the idler elements, a driving sprocket operatively engaging the endless traction chain and positioned intermediate the ends of the truck frame with its axis of rotation concentric with the pivotal axis of the hinged truck frame sections, and yieldable load-supporting connections between the main frame and the swinging truck frame sections.

6. In a track laying tractor, the combination of a main frame, and tractor truck mechanism including a truck frame comprising two sections pivotally connected at their adjoining end portions with the main frame for independent up and down movement at their outer end portions, idler elements on the outer end portions of the frame sections, an endless tread engaging the idler elements, and a yieldable load-supporting connection between each truck frame section and the main frame.

7. In a track laying tractor, the combination of a main frame, and tractor truck mechanism including a truck frame comprising two sections pivotally connected at their adjoining end portions with the main frame centrally of the ends thereof for independent up and down movement at their outer end portions, idler elements on the outer end portions of the truck frame sections, an endless tread engaging the idler elements, and a yieldable load-supporting connection between each truck frame section and the main frame.

8. In a tracklaying tractor, the combination of a main frame, and tractor truck mechanism including a truck frame comprising two sections pivotally connected at their adjoining end portions with the main frame centrally of the ends thereof for independent up and down movement at their outer end portions, idler elements on the outer end portions of the truck frame, an endless tread engaging the idler elements, a yieldable load-supporting connection between each swinging truck frame section and the main frame, and a driving sprocket operatively engaging the endless track and positioned intermediate the end portions of the truck frame at the adjoining pivotally connected end portions of the truck frame sections.

9. In a tractor, the combination of a main frame, a pair of tractor trucks arranged at opposite sides thereof, each tractor truck comprising two sections pivotally connected at their adjoining end portions with the main frame centrally of the ends thereof for independent up and down movement at their free end portions, idler elements on the outer end portions of the said frame sections, an endless tread engaging the idler elements, yieldable load-supporting connections between each truck frame section and the main frame at opposite sides of the pivotal connection of the truck sections with the main frame, two equalizer members, each of said equalizer members being pivotally connected centrally of its ends with the main frame at one side of the pivotal connection of the swinging truck frame sections therewith, and flexible connections between the end portions of the equalizer members and oppositely disposed swinging truck frame sections.

10. In a tractor, the combination of a main frame, a pair of tractor trucks arranged at opposite sides thereof, each tractor truck comprising a frame having two sections pivotally connected at their adjoining end portions with the main frame for independent up and down movement at their free end portions, idler elements on the outer end portions of the said truck frame sections, an endless tread engaging the idler elements, and a yieldable load-supporting connection between each truck frame section and the main frame.

11. In a tractor, the combination of a main frame, a pair of tractor trucks arranged at opposite sides thereof, each tractor truck comprising two sections pivotally connected at their adjoining end portions with the main frame intermediate the ends thereof for independent up and down movement at their free end portions, idler elements on the outer end portions of the said frame sections, an endless tread engaging the idler elements, a yieldable load-supporting connection between each truck frame section and the main frame, two equalizer members, each of said equalizer members being pivotally connected centrally of its ends with the main frame at one side of the pivotal connection of the swinging truck frame sections therewith, and flexible connections between the end portions of the equalizer member and oppositely disposed swinging truck frame sections.

12. In a tractor, the combination of a main frame, a pair of tractor trucks arranged at opposite sides thereof, each tractor truck comprising two sections pivotally connected at their adjoining end portions with the main frame intermediate the ends thereof for independent up and down movement at their free end portions, idler elements on the outer end portions of the said frame sections, an endless tread engaging the idler elements, a yieldable load-supporting connection between each truck frame section and the main frame, two equalizer members, each of said equalizer members being pivotally connected centrally of its ends with the main frame at one side of the pivotal connection of the swinging truck frame sections therewith, flexible connections between the end portions of the equalizer member and oppositely disposed swinging truck frame sections, and two strut members, each of said strut members being interposed between and flexibly connected at its ends with one pair of the swinging truck frame sections.

13. In a tractor, the combination of a main frame, a pair of tractor trucks arranged at opposite sides thereof, each tractor truck comprising two sections pivotally connected at their adjoining end portions with the main frame centrally of the ends thereof for independent up and down movement at their free end portions, idler elements on the outer end portions of the said frame sections, an endless tread engaging the idler elements, a yieldable load-supporting connection between each truck frame section and the main frame, two equalizer members, each of said equalizer members being pivotally connected centrally of its ends with the main frame at one side of the pivotal connection of the swinging truck frame sections therewith, flexible connections between the end portions of the equalizer member and oppositely disposed swinging truck frame sections, and sets of inclined brace members, each set of brace members being pivotally connected at their inner ends with the main frame centrally of the sides and ends thereof, and extending outwardly therefrom and secured at their outer ends to a pair of the oppositely disposed swinging truck frame sections.

In testimony whereof I hereunto affix my signature in the presence of two witnesses.

CLARENCE LEO BEST.

Witnesses:
R. C. FORCE,
I. E. JONES.